United States Patent [19]

List

[11] 4,071,806
[45] Jan. 31, 1978

[54] SELF-TRIGGERING CIRCUIT FOR GAS-FILLED LASER

[75] Inventor: William F. List, Linthicum, Md.

[73] Assignee: Westinghouse Electric Corporation, Pittsburgh, Pa.

[21] Appl. No.: 720,024

[22] Filed: Sept. 2, 1976

[51] Int. Cl.² .............................................. H01S 3/092
[52] U.S. Cl. .................................... 315/150; 315/171; 315/173; 315/208; 331/94.5 PE
[58] Field of Search ........... 315/171, 173, 176, 200 R, 315/208, 240, 244, 150; 331/94.5 P, 94.5 PE

[56] References Cited
U.S. PATENT DOCUMENTS

| 3,551,738 | 12/1970 | Young | 315/171 |
| 3,795,874 | 3/1974 | Pan et al. | 331/94.5 PE |
| 4,005,333 | 1/1977 | Nichols | 331/94.5 PE |

Primary Examiner—Eugene R. La Roche
Attorney, Agent, or Firm—H. W. Patterson

[57] ABSTRACT

A self-triggering circuit for a gas-filled laser is disclosed. Electrical pulses which stimulate laser emission are applied to the laser cavity in response to an electrical energy change in the laser charging circuit when ionizing radiation is injected into the laser cavity. A semiconductor device of the type responsive to dv/dt, or of the type responsive to di/dt, is used as the self-triggering switch.

4 Claims, 4 Drawing Figures

4,071,806

SELF-TRIGGERING CIRCUIT FOR GAS-FILLED LASER

BACKGROUND OF THE INVENTION

1. Field of the Invention

The present invention relates to a self-triggering circuit for a gas-filled laser.

2. Description of the Prior Art

It is common practice to apply repetitive high energy electrical pulses to gas-filled laser tubes in order to stimulate the emission of laser output pulses. That is accomplished by a circuit that includes an energy source coupled to the laser cavity through a pulse forming network. The combination of the energy source and the pulse forming network is commonly termed a laser sustaining network. The pulses at the output of the laser sustaining network are of a predetermined shape and width. Such pulses are typically trapezoidal, with the rise and fall times being approximately one-tenth of the desired laser pulse width, which is typically approximately ten to thirty microseconds. The high energy pulse is isolated from the laser cavity by a switching device until coupling of the pulse to the laser cavity is required. The switching device must be typically capable of handling high energy pulses in sub-microsecond to microsecond times at high repetition rates. The disadvantages of the typical circuit is that the switching device requires additional or auxiliary voltages or currents for activation which are not generated intrinsically within the circuit; the resultant circuit complexity leads to component unreliability and electrical interference problems thereby increasing the cost of operation of laser systems.

SUMMARY OF THE INVENTION

In accordance with the present invention, a self-triggering circuit is provided for transferring a high energy pulse to a gas-filled laser to stimulate the emission of a laser pulse. The self-triggering circuit has the advantage of decreased system complexity and increased component reliability.

The self-triggering is realized by utilizing an active semiconductor device to conduct the high energy pulse in response to a predetermined value of $dv/dt$ at the laser terminal to which it is electrically connected. Injection of ionizing radiation into the laser cavity in accordance with a predetermined timing schedule is employed to initiate the change in voltage at the laser terminal in response to the increase in ionization within the cavity.

In another embodiment an alternate type of active semiconductor can be utilized which is responsive to $di/dt$ at the laser terminal when a flow of current at the laser terminal is initiated in response to the injection of the ionizing radiation into the laser cavity.

DESCRIPTION OF THE PREFERRED EMBODIMENT

Figure 1:
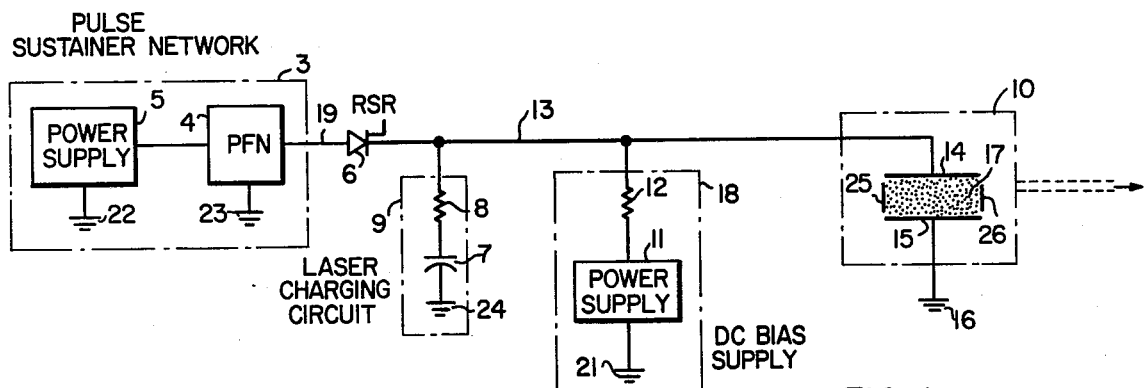
FIG. 1 is a schematic diagram of a self-triggering circuit in accordance with one embodiment of the invention.

Referring to FIG. 1, a conventional gas-filled laser 10 has a conventional power supply 11 connected through resistor 12 and line 13 to a laser anode 14 and cathode 15 terminals to ground 16 and thence to ground 21 to complete the electrical circuit. An interelectrode region 17, commonly known as the laser cavity, is typically filled with gas particles under controlled pressure. A DC bias supply 18 forms a partially ionized electric field across the laser cavity 17 during the steady state or quiescent condition. The average ratio of electric field to gas particle density in the laser cavity 17 can be controlled by varying the DC voltage of the power supply 11. The resistor 12 is of a sufficiently large resistance that the maximum current the power supply 11 can furnish to the laser cavity 17 is less than the minimum current required for the maintenance of the laser cavity glow current.

The steady state voltage between the laser anode 14 and cathode 15 terminals is maintained by the DC bias supply 18 at a level which is between seventy and ninety percent of the sparkover voltage, commonly termed the breakdown or threshold voltage, required to initiate the glow current. Typical gas-filled lasers operate at voltage levels which are compatible with the characteristics of available solid state switching devices utilized in accordance with the present invention. During this period of steady state condition in the laser cavity 17, there is normally a very small current flowing in the laser cavity 17 due to a variety of causes, well known to those familiar with the art, including field emission and possibly ionization of some gas molecules due to chance collisions within the gas molecules, or perhaps due to interaction with high energy particles entering the laser cavity 17 from some natural source such as cosmic rays. The resistor 12 is of a sufficiently large resistance value that the small current normally flowing in the laser cavity 17 during the steady state condition is precluded from avalanching into a full scale discharge. Thus a predetermined potential is maintained between the electrodes 14 and 15 which provides an appropriate level of electric field across the gas in the cavity 17 to facilitate initiation of a current avalanche in the cavity when external ionization of the appropriate characteristics is introduced into the cavity at the time it is desired to initiate a laser pulse. The desired wavelength of the external ionization source is dependent upon the specific composition of the gas mixture within the cavity but is typically in the ultraviolet wavelengths and generated by various means such as ultraviolet flashlamps, electrical sparks, or other means well known to those familiar with the art. Laser cavity 17 is also typically shielded to prevent excitation of the gas molecules from extraneous radiation other than from high energy sources.

A conventional shunt capacitor 7 connected through resistor 8 and line 13 to the laser anode 14 and the cathode 15 terminals to ground 16 thence to ground 24 completes the electrical circuit. The resistor 8 is of sufficiently high resistance that, in addition to preventing the shunt capacitor 7 from discharging instantaneously through the laser cavity 17, the charging time constant of the electrical circuit comprising resistor 8, the shunt capacitor 7 and the laser cavity capacitance is large compared to the recovery time of the laser cavity following laser pulse output.

A conventional high energy pulse power supply 5 connected through a conventional pulse forming network (PFN) 4 to line 19 to an active semiconductor switching device 6 to line 13 to the laser anode 14 to cathode 15 to ground 16 and thence to grounds 22 and 23 complete the electrical circuit. Between successive laser pulses, the semiconductor switching device 6 is non-conductive, thus isolating the power supply 5 and the pulse forming network 4, together comprising the pulse sustainer network 3, from the laser anode 14. One type of switching device 6 utilized in this application is the high power reverse switching rectifier (RSR) which becomes conductive in response to a predetermined value of $dv/dt$ between laser anode 14 and laser cathode 18 terminals.

The RSR has the desirable characteristic of blocking forward voltage until switched to a forward conducting state by a predetermined value of $dv/dt$ forward voltage triggering impulse. Typically values of the turn-on characteristic of one large scale RSR device is 2000 to 5000 amperes in one microsecond. The RSR is presently capable of switching 5000 amperes of current for 20 microsecond pulses at 250 pulses per second at a breakover voltage of 1200 volts and is well suited for stacking to higher breakover voltages and for connecting in series/parallel arrangements for high current carrying capability for higher power applications. A typical RSR was described in the Proceedings of the International Electron Devices Meeting of Dec. 1–3, 1975, in a paper entitled "A Superpower RSR" by Robert A. Gardenghi.

Also shown in FIG. 1 are ionizing electrodes 25 and 26 which inject a periodic pulse of ionizing radiation into the laser cavity 17, a technique well known in the art. Since the laser cavity 17 in the period between pulses is subject to an electrical field by the DC bias supply 18, electrons generated by the interaction of the ionizing radiation with the gas molecules in the laser cavity 17 results in the well known avalanche condition as these electrons are accelerated by the DC bias voltage across the laser cavity 17 and as the laser charging circuit 9 discharges into the laser cavity 17.

It is to be noted in FIG. 1 that since the semiconductive device 6 is connected to the charging circuit 9 and the laser anode 14, each will be subjected to the identical voltage. Consequently, semiconductor device 6 will become conductive when the rate of change of voltage with time, $dv/dt$, reaches a predetermined value following injection of the ionizing pulse into the laser cavity 17, initiating the self-triggering action. The high energy pulse will immediately pass from the laser sustaining network 3 through the conducting semiconductor device 6 to the laser cavity 17, stimulating the emission of the laser output pulse. The semiconductor device 6 will become non-conductive at the termination of the high energy pulse, thus completing the self-triggering action. The laser charging circuit 9 will be recharged by the DC bias power supply 18 between laser output pulses during the recovery time of the laser. The semiconductor device 6 is thus a self-triggered switch which becomes conductive in response to $dv/dt$ at the laser anode terminal 14 to pass the high energy pulse from the pulse sustainer network 3 to the laser cavity 17 and becomes non-conductive at the termination of the high energy pulse; no externally applied means are required to augment the self-triggering response of the semiconductor device 6. The semiconductor device 6 allows for more reliable pulse switching because it is responsive to a rate of change of voltage rather than to the absolute value of voltage. The energy from the pulse sustainer network 3 to maintain the glow discharge is not decreased substantially because of the switching device 6 since the forward voltage drop of the switching device 6 in the conductive condition is of the order of tens of volts whereas the laser cavity glow voltage is on the order of thousands of volts. The triggering of the switching device 6 is thus responsive to the rapid change in ionization conditions in the laser cavity 17 following injection of the ionizing radiation pulse. This triggering action results from the inherent regenerative feedback which is characteristic of four-layer silicon devices in general and which is optimized for sensitivity to $dv/dt$ by selection of fabrication techniques for RSR devices well known to those familiar with the art.

Although conventional methods of switching high current pulses at high repetition rates increases the cost and complexity of pulsed power supplies required in typical high power laser devices, this invention reduces the complexity of the switching means, thus reducing the cost and improving the reliability of the typical laser sustaining network.

The advantage of the approach in this invention to switching the high power circuit over conventional approaches to switching is that ionizing energy needed for switching is characteristically only a few percent of the total energy needed by the laser. Thus, an effective power gain is obtained in that only the power needed to trigger the ionizing radiation need actually be switched. One embodiment of ionizing electrodes 25 and 26 is shown in FIG. 1; other embodiments may be employed depending on the type of ionizing radiation to be utilized. Since this ionizing radiation can be in the form of an electron beam or a beam of ionizing UV radiation, or radiation generated by electrically and physically isolated spark discharge circuits (automobile spark plugs, for example), there is no electrical circuitry which need be common between the ionizing radiation and the laser sustaining network, thus minimizing electrical crosstalk problems which can often be extremely severe when high voltages and high currents are involved.

Details of the mechanism for the trigger pulse injection and the construction of the gas-filled laser including its terminals, the shielded interelectrode region in laser cavity, optical components, and gas-handling equipment are not shown in that they are well known in the art. A summary of papers describing the general area of gas-filled lasers and related subjects can be found in a number of technical papers such as in the "Digest of Papers", 1973 IEEE/OSA Conference on Laser Engineering and Applications, IEEE Cat. No. 73, CH0739-3 Laser.

Figure 2:
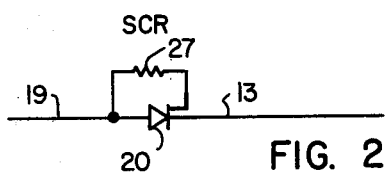
FIG. 2 illustrates the connection of a device responsive to $di/dt$ in the self-triggering circuit of FIG. 1 in accordance with an alternate embodiment of the invention.

FIG. 2 illustrates another embodiment for the self-triggering circuit with the utilization of a silicon controlled rectifier (SCR) 20 with a bias resistor 27 connected to the gate as the semiconductor switching device. The SCR 20 is non-conductive during the steady state condition of the self-triggering circuit until there is a change in current with respect to time, $di/dt$, in line 13 in response to the injection of ionizing radiation into the laser cavity 17. At a predetermined value of $di/dt$, the SCR 20 will be switched from a non-conductive to a forward conductive state. The high energy pulse output from the laser sustaining network 3 will pass through the SCR 20 to laser anode 14 to stimulate the emission of laser pulses. The SCR 20 will become non-conductive at the termination of the high energy pulse thus completing the self-triggering action. The silicon controlled rectifier switching devices are currently available with hold-off voltages in excess of one kilovolt per unit and current capability in excess of 5000 amperes per unit.

Figure 3:
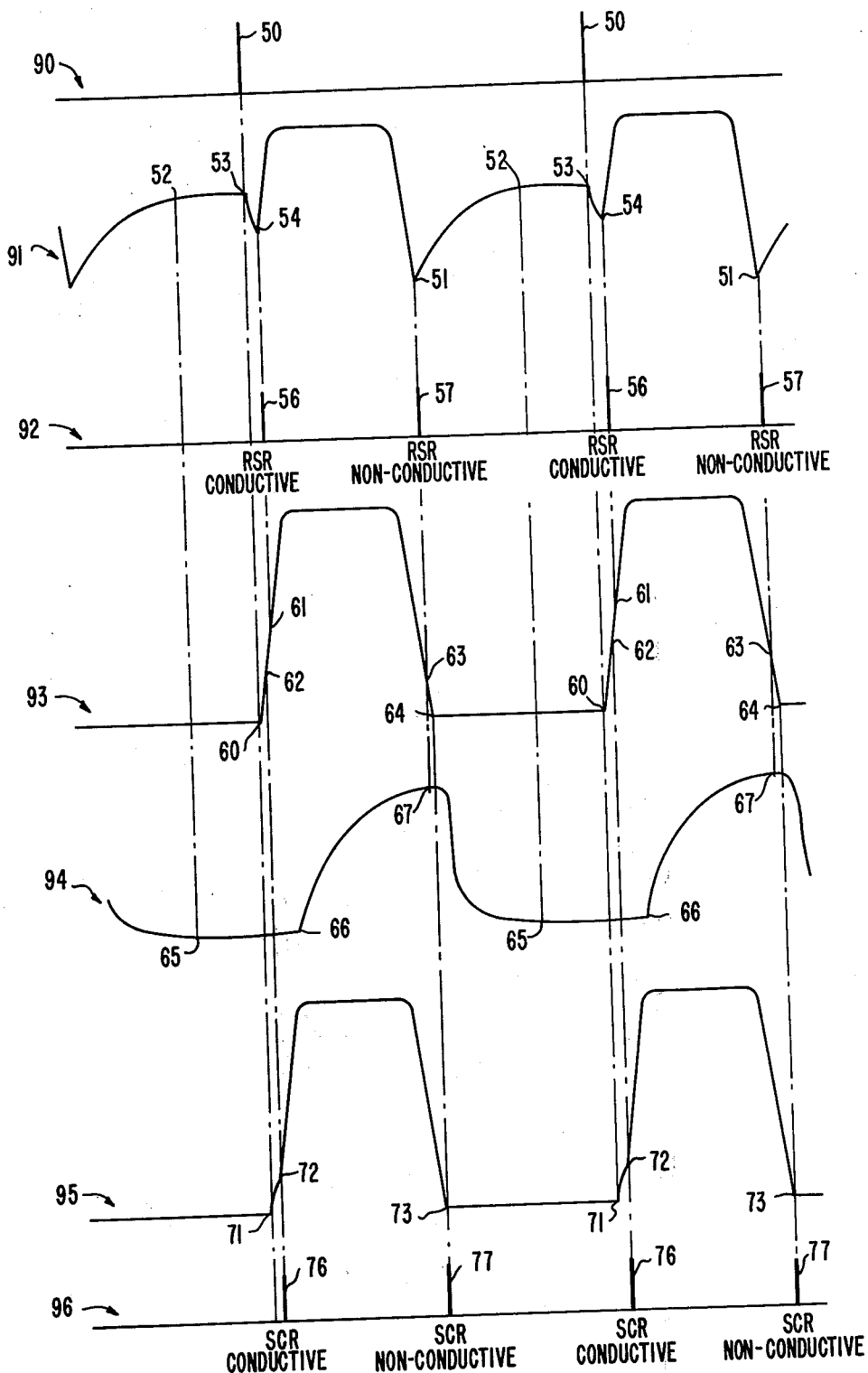
FIG. 3 is a diagram showing the operation of the self-triggering circuit.

Referring to FIG. 3 (not to scale), the operation of the self-triggered laser circuit is initiated by the periodic injection of an ionizing pulse 50 into the gas-filled laser cavity 17 (FIG. 1) at predetermined times as shown in graph 90 of FIG. 3.

Voltage curve 91 of FIG. 3 illustrates the initiation of the charging cycle of the laser charging circuit 9 (FIG. 1) such as at point 51 until the charging of this circuit is substantially completed at point 52. Steady state condition will exist from approximately point 52 to point 53 at which time point 50 the ionizing radiation is injected into the laser cavity. Immediately, the various capacitances in the laser circuit will commence to discharge into the gas-filled cavity of the laser and the voltage across the laser cavity to decrease along an exponential time-constant curve of the laser circuit parameters until a predetermined value of $dv/dt$ is reached such as at point 54. Approximately at point 56 in graph 92 of FIG. 3 the reverse switching rectifier (RSR) 6 (FIG. 1) will become conductive to the high energy pulse output of the pulse sustainer network 3 (FIG. 1) in response to the predetermined value of $dv/dt$; at this time the high energy pulse will be passed through the RSR to the laser cavity. The waveshape of the high energy pulse entering the laser cavity is shown on curve 91 from point 54 to point 51. At a time located approximately at point 57 on graph 92 of FIG. 3 the RSR will cease to conduct; thus terminating the passage of the high energy pulse into the laser cavity.

Curve 93 of FIG. 3 shows the high energy, trapezoidally-shaped, output pulse from the pulse sustainer network. The initiation of each high energy pulse is at point 60 approximately at the same moment that the ionizing radiation is injected into the laser cavity at the commencement of the laser cycle at point 50 of graph 90 of FIG. 3. The portion of the high energy pulse approximately between points 61 and 63 passes through the RSR to stimulate the laser emission, where point 61 coincides with RSR conducting at point 56 and point 63 coincides with RSR non-conducting at point 57.

The usual shape of the laser output pulse emitted by a gas-filled laser is shown on curve 94. The steady state energy condition starts approximately at point 65 at which time the laser charging circuit is approximately fully charged. The laser pulse usually commences at point 66 which is at a time immediately following the high energy pulse input; the laser pulse will rise approximately as shown in curve 94 until point 67 which coincides approximately with the point 57 of graph 92 of FIG. 3 where the RSR becomes non-conducting. The laser pulse output will then drop approximately as shown in curve 94 in FIG. 3 to point 65 where the laser steady state energy condition will return.

Current curve 95 of FIG. 3 illustrates the operation of the gas-filled laser charging circuit wherein an alternate embodiment of the switching device in the self-triggering circuit is a silicon controlled rectifier (SCR) 20 (FIG. 1) with a bias resistor connected to its gate 27 (FIG. 1). The steady state current condition is a very small current flow in the gas-filled laser cavity wherein a minimum level of ionization is maintained. The periodic injection of the ionizing pulse 50 into the laser cavity, shown in graph 90 of FIG. 3, will immediately cause an increase in ionization current to flow in the gas-filled laser cavity, discharging the laser circuit capacitances. The current will increase exponentially from point 71 to point 72 of curve 95 in FIG. 3 along the time-constant curve of the laser circuit parameters until a predetermined value of $di/dt$ is reached such as at point 72. Approximately at point 76 on the graph 96 of FIG. 3 the silicon controlled rectifier (SCR) will become conductive to the high energy pulse output of the pulse sustainer network in response to the predetermined value of $di/dt$; at this time the high energy pulse will be passed through the SCR to the laser cavity. The waveshape of the high energy pulse entering the laser cavity is shown on curve 95 from point 72 to point 73. At a time located approximately at point 77 on graph 96 of FIG. 3, the SCR will cease to conduct, thus terminating the passage of the high energy pulse into the laser cavity.

Figure 4:
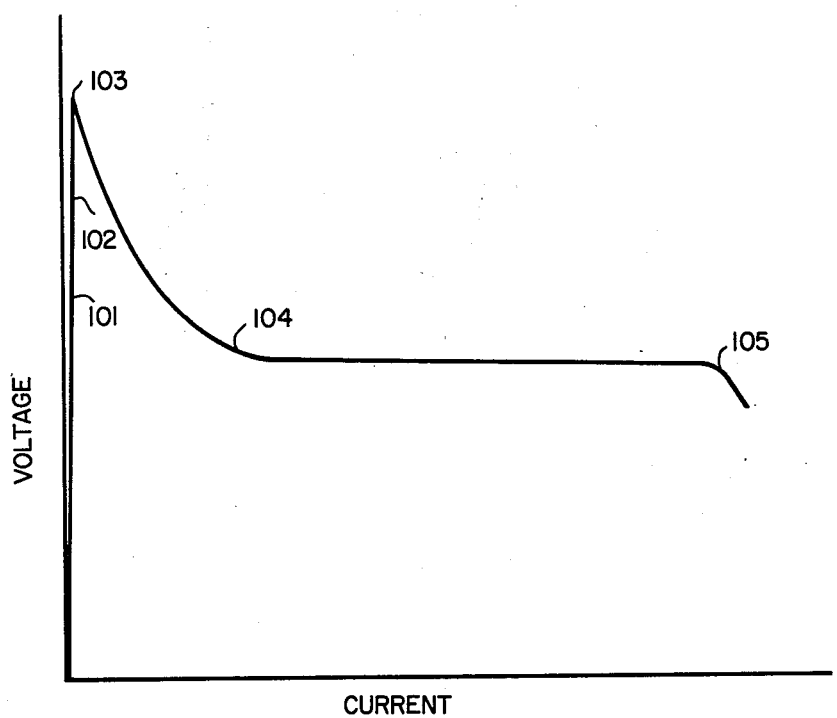
FIG. 4 shows voltage-current relationship of a glow discharge device to assist in a better understanding of the invention.

Referring to the conventional voltage-current relationship in a gas-filled laser cavity as shown in FIG. 4, the steady state or quiescent condition is within points 101 and 102 with the sparkover voltage at point 103. The range of steady state voltages, as previously mentioned, is assumed to be within seventy and ninety percent of the sparkover voltage, being maintained within that range by the DC bias supply voltage. There is also a small level of current flowing within a gas-filled laser cavity due to the partial ionization of the gas and other causes previously mentioned. The injection of the pulse of ionizing radiation into the laser cavity results in a sudden increase in the ionization of the gas in the laser cavity and a rapid rise to the sparkover voltage at point 103. As the laser circuit capacitances now commence discharging into the increasingly ionized laser cavity, there will be a change of voltage and of current with time. At a predetermined value of $dv/dt$ within points 103 and 104, the reverse switching rectifier (FIG. 1) will become conductive to the high energy pulse which will then be passed through to the highly ionized gas-filled laser cavity in the region within points 104 and 105 to stimulate laser emission. In the alternate embodiment of the self-triggering circuit, the silicon controlled rectifier (FIG. 2) will become conducting to the high energy pulse at a predetermined value of $di/dt$ within points 103 and 104, passing the high energy beam to the cavity also within points 104 and 105.

I claim:

1. A self-triggering apparatus and circuit for use in producing an output from a gas-filled laser comprising:
   a. a gas-filled laser having a cavity including means for injecting an ionizing radiation pulse into said laser cavity for ionizing the gas therein;
   b. bias circuit means for generating a low current discharge to initiate a glow discharge in said laser cavity in response to ionization of said gas;
   c. pulse generating means for generating a laser sustaining discharge pulse voltage across said laser cavity; and
   d. switching means, including an active semiconductor device, responsive to the ratio of the change in electrical parameters with respect to a change in time occurring in the laser in response to the initiation of said low current discharge by introduction of the ionizing radiation pulse, for electrically connecting said laser sustaining discharge pulse voltage to said laser cavity for transferring pulse energy from said pulse generating means to said glow discharge.

2. A self-triggering apparatus and circuit for use in producing an output from a gas-filled laser comprising:
   a. a gas-filled laser having a cavity including means for injecting an ionizing radiation pulse into said laser cavity for ionizing the gas therein;
   b. bias circuit means for generating a low current discharge to initiate a glow discharge in said laser cavity in response to ionization of said gas;
   c. pulse generating means for generating a laser sustaining discharge pulse voltage across said laser cavity; and
   d. switching means, including a reverse switching rectifier, responsive to the ratio of a change of voltage with respect to a change in time occurring in the laser in response to the initiation of said low current discharge by introduction of the ionizing radiation pulse for electrically connecting said laser sustaining discharge pulse voltage to said laser cavity for transferring pulse energy from said pulse generating means to said glow discharge.

3. A self-triggering apparatus and circuit for use in producing an output from a gas-filled laser comprising:
   a. a gas-filled laser having a cavity including means for injecting an ionizing radiation pulse into said laser cavity for ionizing the gas therein;
   b. bias circuit means for generating a low current discharge to initiate a glow discharge in said laser cavity in response to ionization of said gas;
   c. pulse generating means for generating a laser sustaining discharge pulse voltage across said laser cavity; and
   d. switching means, including a resistor biased silicon controlled rectifier, responsive to the ratio of a change of current with respect to a change in time occurring in the laser in response to the initiation of said low current discharge by introduction of the ionizing radiation pulse for electrically connecting said laser sustaining discharge pulse voltage to said laser cavity for transferring pulse energy from said pulse generating means to said glow discharge.

4. A method of producing an output from a gas-filled laser having a cavity including means for injecting an ionizing radiation into said laser cavity for ionizing the gas therein, which comprises the following steps in the order named:
   a. Generating a low current discharge to initiate a glow discharge in said laser cavity in response to ionization of said gas;
   b. Generating a laser maintaining discharge pulse voltage across said cavity;
   c. Transferring pulse energy from said pulse voltage to said glow discharge in the cavity in response to the ratio of the change of electrical parameters of the laser with respect to a change in time occurring in response to the initiation of said low current discharge.

* * * * *